United States Patent
Erdogan et al.

(10) Patent No.: US 8,770,884 B2
(45) Date of Patent: Jul. 8, 2014

(54) ELASTOMERIC JOINT

(75) Inventors: Cengiz Erdogan, Geldern (DE); Richard Partyka, Luhacovice (CZ)

(73) Assignee: TRW Automotive GmbH, Alfdorf (DE)

( * ) Notice: Subject to any disclaimer, the term of this patent is extended or adjusted under 35 U.S.C. 154(b) by 196 days.

(21) Appl. No.: 13/265,587

(22) PCT Filed: Mar. 30, 2010

(86) PCT No.: PCT/DE2010/000367
§ 371 (c)(1),
(2), (4) Date: Jan. 12, 2012

(87) PCT Pub. No.: WO2010/112006
PCT Pub. Date: Oct. 7, 2010

(65) Prior Publication Data
US 2012/0107038 A1    May 3, 2012

(30) Foreign Application Priority Data

Apr. 3, 2009    (DE) .......................... 10 2009 016 139

(51) Int. Cl.
*F16C 11/08* (2006.01)
*B60G 7/00* (2006.01)
*F16F 1/393* (2006.01)

(52) U.S. Cl.
CPC ............... *B60G 7/005* (2013.01); *F16F 1/393* (2013.01)
USPC ............................ 403/147; 403/132; 403/135

(58) Field of Classification Search
CPC ............. F16C 11/0614; F16C 11/0623; F16C 11/0628; F16C 11/0638
USPC ......... 403/123, 132, 133, 135, 140, 145, 146, 403/147, 122; 411/517, 530
See application file for complete search history.

(56) References Cited

U.S. PATENT DOCUMENTS 2,856,250 A * 10/1958 Thoma .......................... 403/144
4,559,692 A * 12/1985 Morin ........................... 403/140
(Continued)

FOREIGN PATENT DOCUMENTS

DE          3715360 A1     12/1988
DE          4428870 C1     11/1995
(Continued)

OTHER PUBLICATIONS

International Search Report dated Jul. 30, 2010 to PCT/DE2010/000367.
Office Action issued by the Chinese Patent Office dated Jul. 19, 2013.

*Primary Examiner* — Michael P Ferguson
(74) *Attorney, Agent, or Firm* — MacMillan, Sobanski & Todd, LLC

(57) ABSTRACT

The invention relates to an elastomeric joint, comprising a housing with a through-opening which extends axially along the longitudinal axis of the elastomeric joint, a pivot pin which extends through the through-opening of the housing, an elastomeric body which is fastened to the pivot pin and is arranged radially between the pivot pin and the housing, and with at least one supporting ring which is fastened to the elastomeric body on one end face of the through-opening, wherein a wire ring locks the supporting ring with respect to the housing, with the result that the pivot pin is held in the housing in an axially secured manner.

14 Claims, 9 Drawing Sheets

(56) References Cited

U.S. PATENT DOCUMENTS

| | | | |
|---|---|---|---|
| 4,666,330 A * | 5/1987 | O'Connell | 411/530 |
| 4,883,262 A | 11/1989 | Calvert | |
| 4,883,263 A | 11/1989 | Buhl | |
| 5,372,446 A * | 12/1994 | Chamberlin | 403/122 |
| 5,477,614 A | 12/1995 | Watanabe | |
| 7,306,393 B2 * | 12/2007 | Erdogan | 403/133 |
| 2005/0179182 A1 | 8/2005 | Wolter et al. | |

FOREIGN PATENT DOCUMENTS

| | | | |
|---|---|---|---|
| EP | 0351689 A1 | 1/1990 | |
| EP | 1811195 A1 | 7/2007 | |
| JP | 01158950 A | 6/1989 | |
| JP | 2002-188619 * | 5/2002 | F16C 11/08 |

* cited by examiner

ELASTOMERIC JOINT

CROSS-REFERENCE TO RELATED APPLICATIONS

This application is a national stage of International Application No. PCT/DE2010/000367 filed Mar. 30, 2010, the disclosures of which are incorporated herein by reference in entirety, and which claimed priority to German Patent Application No. 10 2009 016 139.2 filed Apr. 3, 2009, the disclosures of which are incorporated herein by reference in entirety.

BACKGROUND OF THE INVENTION

The invention relates to an elastomeric joint, in particular for chassis components of motor vehicles.

Elastomeric joints are maintenance-free, insensitive to external environmental influences and are used in particular in automotive engineering for precise axle location as well as for improving the driving comfort. In elastomeric joints of this type, an elastic elastomeric body is prestressed in axial direction, resulting in an adjustable radial spring characteristic.

DE 37 15 360 C2, and corresponding U.S. Pat. No. 4,883,263A, both of which are incorporated by reference herein in entirety, shows a generic elastomeric joint in which a sleeve-shaped elastomeric body is prestressed between two supporting rings. The inner circumferential surface of a cylindrical housing is provided with material recesses in a central zone so that a space is created into which the elastomeric body may move. This results in the pretension of the elastomeric body being reduced in this area, resulting in a progressive spring characteristic with increasing load. For axially securing the elastomeric body within the housing, one of the two supporting rings is supported by an inner shoulder of the housing, while the other supporting ring is retained by a snap ring inserted during assembling the joint.

The snap ring which is used, for instance, in the elastomeric joint according to DE 37 15 360 C2, is also known as a so-called "Seeger ring". The Seeger ring is distinguished in that it can be obtained as a standard part on the market at a very low price and allows to dismantle the elastomeric joint in a simple manner. The Seeger ring, however, has the disadvantage that a tilting moment acts on it during axial loads due to its rectangular cross-section, which may result in the Seeger ring coming loose from a groove which is formed in an inner circumferential surface of the housing. Such a tilting moment at least results in frequent axial displacements of the Seeger ring, as a result of which fatigue fractures may occur in the supporting ring being in contact with the Seeger ring. A further disadvantage of the Seeger ring is that its circular arc extension only amounts to approximately 270°, likewise entailing the risk of coming loose.

BRIEF SUMMARY OF THE INVENTION

Accordingly, the invention is based on a feature to provide an elastomeric joint with simple and robust locking means.

An elastomeric joint according to the invention is in particular suitable for being used for chassis components of motor vehicles and comprises a housing with a through-opening which extends axially along the longitudinal axis of the elastomeric joint. Moreover, the elastomeric joint comprises a pivot pin which extends through the through-opening of the housing, and an elastomeric body which is fastened to the pivot pin and arranged radially between the pivot pin and the housing. On an end face of the through-opening, a supporting ring is attached to the elastomeric body or to the pivot pin, a locking element locking the supporting ring with respect to the housing so that the pivot pin is held in the housing in an axially secured manner. The locking element is formed from a wire ring.

Using the wire ring in a function as a locking element, by means of which the supporting ring is locked with respect to the housing, has the advantage that due to the suitable cross-section of such a wire ring in particular in case of axial loads on the pivot pin tilting moments resulting in the wire ring coming loose or being detached do not occur. The wire ring may be manufactured from a conventional round spring steel, being advantageous in terms of low manufacturing and purchase costs.

In an advantageous further development of the invention, the wire ring may have an essentially circular cross-section. Semi-finished products with such a cross-section are available in large quantities and are accordingly inexpensive. As stated above, a circular cross-section prevents the generation of a tilting moment and additionally ensures a sufficient overlap with an adjoining wall of the housing. As an alternative, the wire ring may also have another suitable cross-section, in which no tilting moment during loading the elastomeric joint is provoked, similar to the circular cross-section. To this end, a polygonal or oval cross-section is suitable. A polygonal cross-section of the wire ring preferably has the shape of a triangle, with a tip of this triangle being directed to the adjoining end face of the through-opening, and an orthogonal line, extending through this tip and relating to the base side of the triangle opposite said tip, enclosing an angle with the longitudinal axis of the elastomeric joint which is smaller than 90°. Same applies mutatis mutandis for the oval cross-section, whose longitudinal axis points towards the adjoining end face of the through-opening and encloses an angle with the longitudinal axis of the elastomeric joint which is smaller than 90°.

In an advantageous further development of the invention, an inner circumferential surface of the housing may comprise a groove whose contour is adapted to the cross-section of the wire ring. This has the effect that the wire ring when mounted harmonically fits in the inner circumferential surface of the housing without any canting situations or the like. Such a groove may be predefined in the inner circumferential surface of the housing at low cost, e.g. by a machining process or directly during the very first process of shaping the housing, for instance as a cast part. In all the above-mentioned possible cross-sectional shapes for the wire ring, there is the advantage that in particular for axial loads on the elastomeric joint, the wire ring is pressed into the groove without the occurrence of a tilting moment and/or an axial displacement of the wire ring. Thus, an undesired detachment or even fatigue fractures in the supporting ring can be effectively avoided.

In an advantageous further development of the invention, the wire ring may have a circular arc extension of at least 300°, and in particular a circular arc extension of at least 340° or even more. In any case, such a circular arc extension is larger than that of a Seeger ring. This results in the advantage that the displacements of the free ends of the wire ring with axial loads on the pivot pin are smaller, whereby the contact points of the supporting ring on the free ends of the wire ring are stressed to a lesser extent. As a result, fatigue fractures of the supporting ring can be avoided. Comparative tests have shown that with equal loads in axial direction, an elastomeric joint comprising a wire ring did not show any fracture phenomena on the supporting ring, whereas a comparable embodiment comprising a Seeger ring showed fracture phenomena on the supporting ring.

In an advantageous further development of the invention, the wire ring may be in contact with a contact surface of the supporting ring, said contact surface enclosing an angle of essentially 45° with the longitudinal axis of the elastomeric joint. Such an angle of the contact surface of the supporting ring relative to the longitudinal axis of the elastomeric joint has the advantage that for axial loads on the pivot pin or on the elastomeric joint there will be a resultant force which is suitably directed radially towards the groove formed in the inner circumferential surface of the housing. This is why any detaching of the wire ring from the groove will be effectively prevented so that a safe positioning of the pivot pin in the housing is ensured in axial direction.

In an advantageous further development of the invention, the supporting ring may comprise a bulge which is adjacent to the contact surface and comprises an apex in the direction towards the end face of the through-opening. A distance between this apex and a point at which the groove continues into the inner circumferential surface of the housing is selected so as to be smaller than the diameter of the wire ring. This results in the advantage that the wire ring in the assembled state of the elastomeric joint is prevented from moving towards the end face of the through-opening due to the passage between the apex and the wall of the inner circumferential surface being too narrow. In addition, this circumstance prevents an undesired coming loose of the wire ring and thus increases the operational reliability.

In an advantageous further development of the invention, the supporting ring may be formed from a sheet metal stamped part. This has an advantageous effect on the manufacturing costs. Such a sheet metal stamped part, including the previously mentioned angled contact surfaces, can be produced in one working step without the need of subsequent post-processing steps or the like.

The elastic elastomeric body is always axially prestressed when mounted, resulting in a predetermined and desired spring characteristic of the elastomeric joint. This pretension may be achieved in that the elastomeric body is clamped between the supporting rings. Here, the supporting rings may be directly fastened to the pivot pin, embracing the elastomeric body at both sides at its axial end faces in the manner of a cover. In such an embodiment, a torsional movement of the elastomeric body with respect to the housing is ensured. As an alternative, the supporting rings may be directly fastened to the elastomeric body, for instance by vulcanizing. In doing so, the supporting rings are radially fastened or vulcanized to an outer circumferential surface of the elastomeric body. This allows a torsional movement of the elastomeric body with respect to the housing as well as a cardanic tilting motion in a defined angular range relative to the longitudinal axis of the elastomeric joint, for instance in an angular range of 15°.

In an advantageous further development of the invention, the housing may comprise a bore hole which is accessible from outside and opens at a place adjoining the wire ring. It is possible to insert an auxiliary tool through this bore hole, e.g. a mandrel or the like, whose tip comes into contact with at least one free end of the wire ring. This auxiliary tool allows to selectively detach the wire ring from the groove in order to dismantle the elastomeric joint, if required.

In an advantageous further development of the invention, both end faces of the through-opening may be provided with a supporting ring, each being locked with respect to the housing by a locking element in the form of a wire ring. This results in the advantage that an inner circumferential surface of the housing may be formed so as to be symmetrical, resulting in cost advantages. In other words, the pivot pin in such an embodiment is fixed to the housing at both sides in the region of the respective end face of the through-opening by means of a wire ring. Thus, it is not necessary to provide a shoulder portion or the like within the housing, where otherwise the supporting ring would be supported for the purpose of axially fixing it.

It goes without saying that the previously mentioned features and those which are to be explained below may be used not only in the combination specified in each case, but also in other combinations or in solitary use without leaving the scope of the present invention.

Other advantages of this invention will become apparent to those skilled in the art from the following detailed description of the preferred embodiments, when read in light of the accompanying drawings.

DETAILED DESCRIPTION OF THE INVENTION

Figure 11:
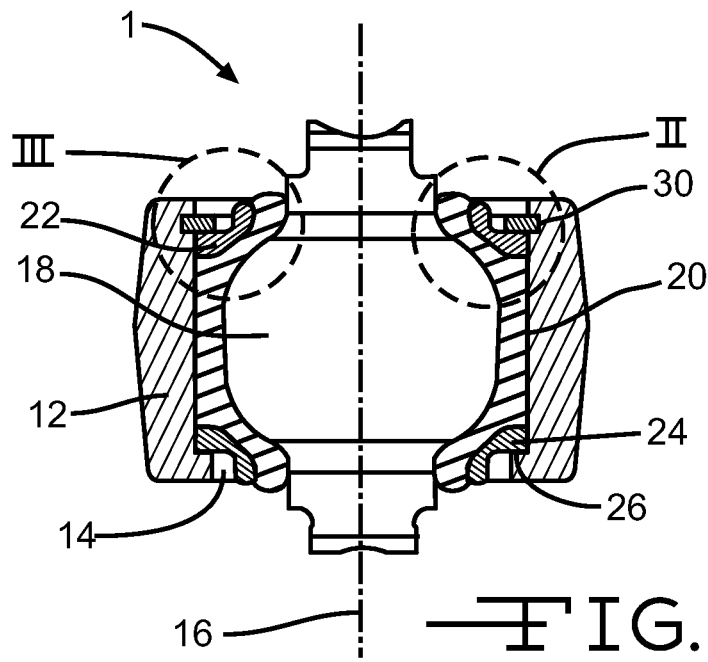
FIG. 11 shows a conventional elastomeric joint in a lateral cross-sectional view.

FIG. 11 shows a conventional elastomeric joint 1 in a lateral cross-sectional view. The elastomeric joint 1 comprises a housing 12 with a through-opening 14 extending axially a longitudinal axis 16 of the elastomeric joint 10. A pivot pin 18 extends through the through-opening 14 and is received in it. Fastened to the outer circumferential surface of the pivot pin 18 is an elastomeric body 20 which has its outer circumferential surface resting against an inner circumferential surface of the housing 12 in the central area of the elastomeric joint 1. The elastomeric body 20 may be fastened to the pivot pin 18 or the inner circumferential surface of the housing 12 by vulcanizing, gluing or the like. The elastomeric body 20 allows a motion of the pivot pin 18 relative to the housing 12 in a rotational manner about the longitudinal axis 16 and/or in cardanic fashion, i.e. in the sense of a tilting motion about the longitudinal axis 16.

An upper supporting ring 22 and a lower supporting ring 24 are fastened, for instance by vulcanizing, gluing or the like, to the elastomeric body 20 in the area of the two end faces of the through-opening 14. The elastomeric body 20 is axially pre-stressed, i.e. in the direction of the longitudinal axis 16, by means of the supporting rings 22, 24. The lower supporting ring 24 rests on a shoulder portion 26 on the inner circumferential surface of the housing 12 so that it is axially positioned. The upper supporting ring 22 is secured by a locking element 28 in the form of a snap ring (also known as "Seeger ring"), which is illustrated individually in FIG. 12 in a top view and in FIG. 13 in a side view. When mounted, the Seeger ring 28 engages with a groove 30 which is formed in the inner circumferential surface of the housing 12. When the Seeger ring 28 is mounted, the upper supporting ring 22 is also axially positioned within the housing 12. In the mounted state according to the illustration of FIG. 11, the pivot pin 18 is secured against dropping out of the housing 12.

Figure 14:
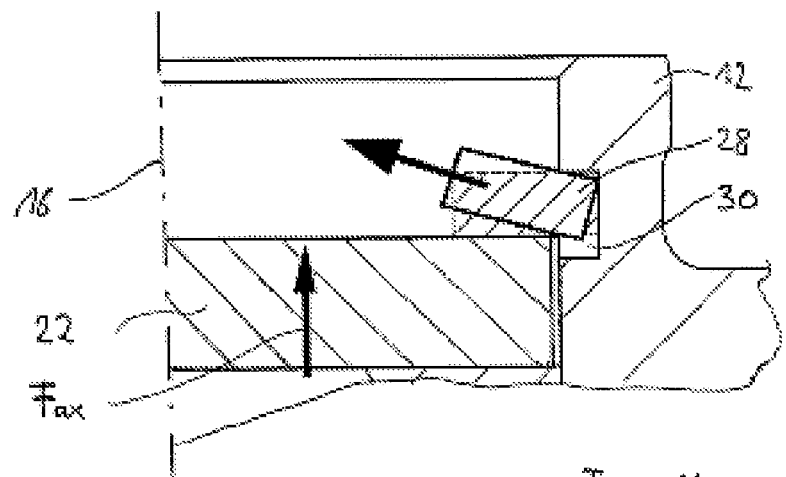
FIG. 14 is an enlarged view of area II of FIG. 11 in the event of an axial loading case.
Figure 15:
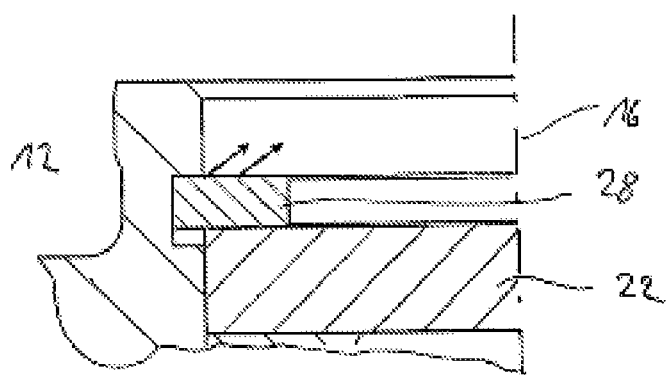
FIG. 15 shows an enlarged view of area III of FIG. 11 under the influence of an axial load.

The axial fixation of the upper supporting ring 22 in the housing 12 by means of the Seeger ring 28 is disadvantageous in this respect that the Seeger ring 28 may come loose from the groove 30 if a certain load level on the elastomeric joint 1 is exceeded. FIG. 15 shows area III of FIG. 11 in the situation when an axial load acts on the pivot pin 18 and hence on the Seeger ring 28. Arrows in FIG. 15 represent the force direction and the resultant forces acting on the Seeger ring 28 in the case of an axial load. FIG. 14 shows the area II of FIG. 11 and is mirror-inverted to the representation of FIG. 15. FIG. 14 shows the process of the Seeger ring 28 coming loose from the groove 30 as a result of an axially acting force $F_{ax}$. Due to the rectangular cross-section of the Seeger ring 28, the axial force $F_{ax}$ brings about the effect that a tilting moment acts on the Seeger ring 28, resulting in the Seeger ring 28 coming loose in the end.

Figure 12:
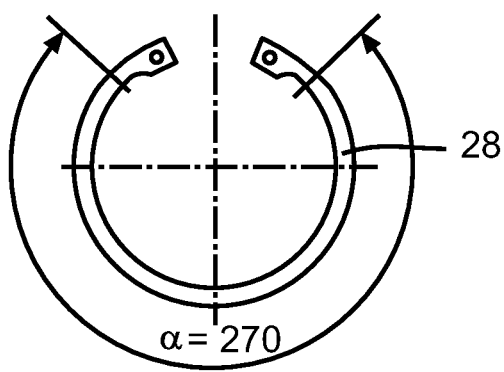
FIG. 12 is a top view of a locking element in the form of a conventional Seeger ring.
Figure 13:
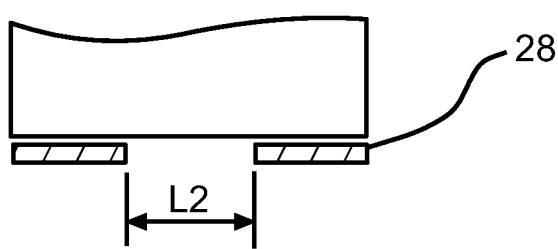
FIG. 13 is a side view of the Seeger ring according to FIG. 12.

Damages to the elastomeric joint 1 may occur, on the one hand, in that the Seeger ring 28 comes loose from the groove 30 as shown in FIG. 14 so that the upper supporting ring 22 is not secured in the housing 12 any longer. A further possibility of damages in the elastomeric joint 10 according to FIG. 11 is that fatigue fractures occur in the upper supporting ring 22 in those areas which are in direct contact with the two free ends of the Seeger ring 28. Such fatigue fractures result from the fact that an axial load on the pivot pin 18 brings about small axial displacements of the Seeger ring 28, in particular in the area of its two free ends. Such displacements are supported by the fact that the Seeger ring 28, as shown in FIG. 12, has a circular arc extension of approximately 270° so that the free ends are spaced from each other by a relatively large distance. This distance is identified in FIG. 13 by distance L2. As a whole, the axial securement of the upper supporting ring 22 by means of the Seeger ring 28 has a low operational reliability because of the mentioned possibilities of damage.

Figure 1:
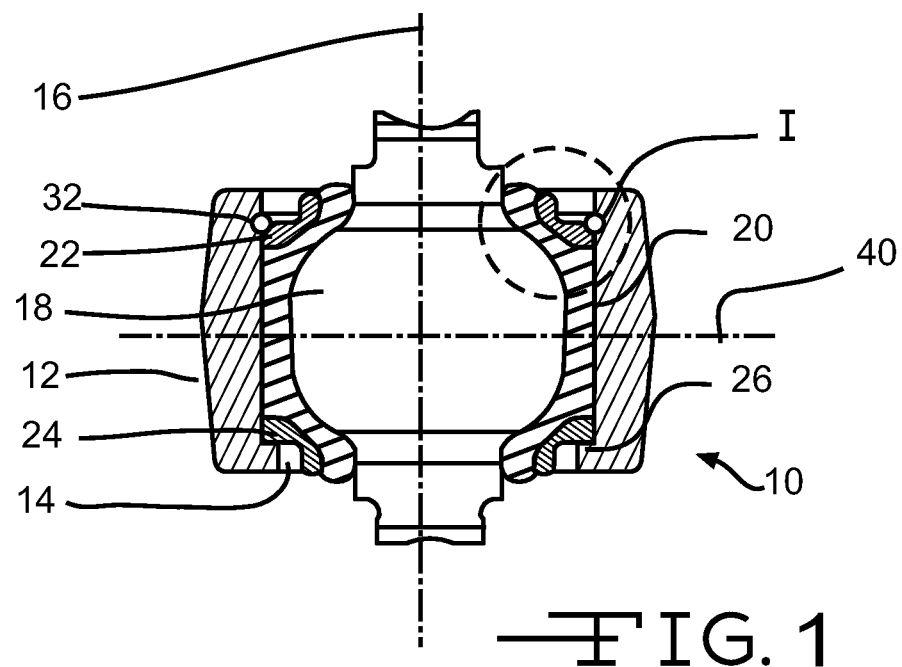
FIG. 1 shows an elastomeric joint according to the invention in a lateral cross-sectional view.

FIG. 1 shows an elastomeric joint 10 according to the invention in a lateral cross sectional view. In terms of its basic design, this joint corresponds to that of FIG. 8—important components are provided with identical reference numerals and will not be explained again in order to avoid repetitions.

A basic difference of the elastomeric joint 10 according to FIG. 1 with respect to the conventional elastomeric joint 1 according to FIG. 11 is the securement of at least one of the two supporting rings. In the elastomeric joint of FIG. 1, the upper supporting ring 22 is held in the housing 12 in an axially secured manner by means of a wire ring 32 instead of a Seeger ring 28. The wire ring 32 may be made from conventional round spring steel or the like. Accordingly, the production of this wire ring and its purchase are very cost-effective.

Figure 2:
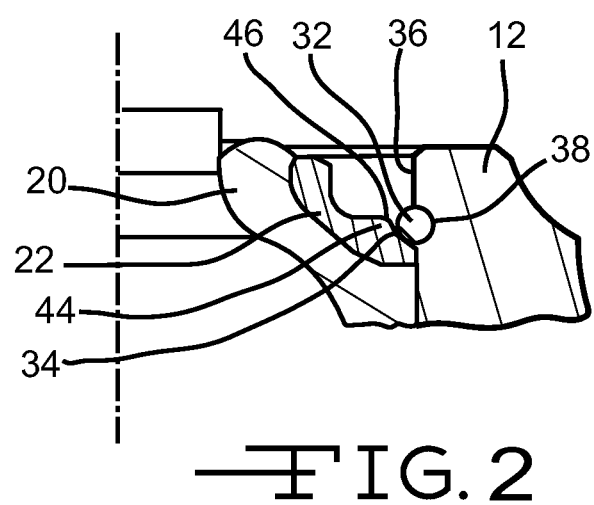
FIG. 2 shows an enlarged view of area I of FIG. 1.

FIG. 2 shows area I of FIG. 1 in an enlarged view. Adjacent to its outer circumferential surface, the upper supporting ring 22 comprises a contact surface 34 which is in contact with the wire ring 32. A groove 38 is formed on an inner circumferential surface 36 of the housing 12 and has a contour which is adapted to the substantially circular cross-section of the wire ring. In the mounted state, the wire ring 32 harmonically fits in the groove 38 without the occurrence of any canting situations or the like.

Figure 3:
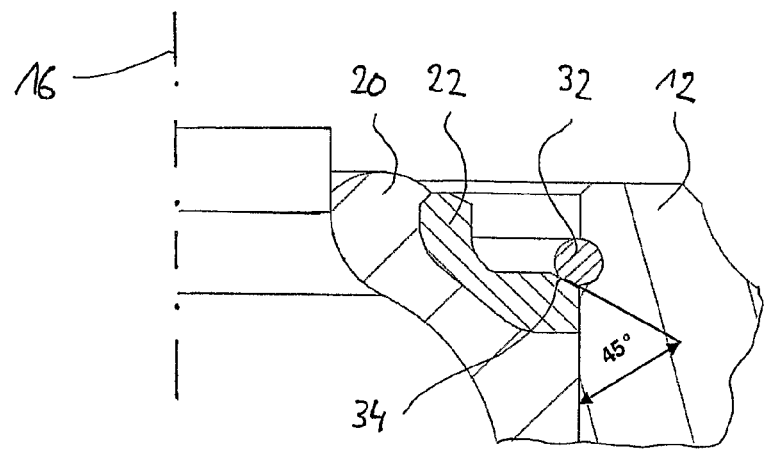
FIG. 3 shows an enlarged view of area I of FIG. 1 in a modified embodiment.
Figure 4:
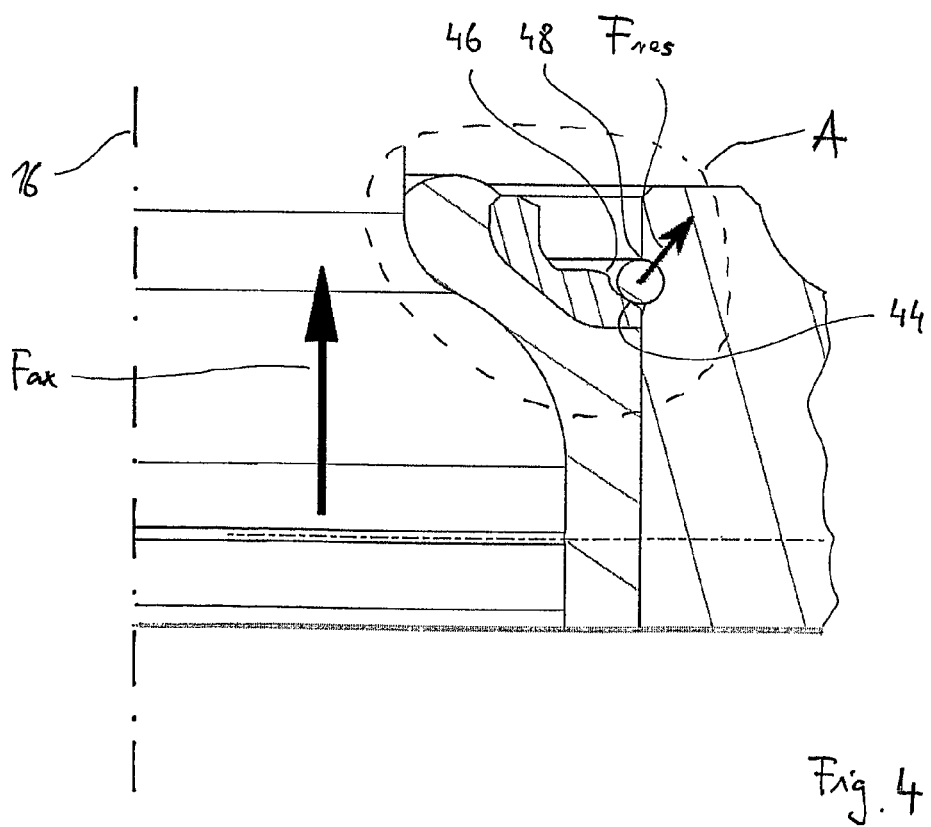
FIG. 4 shows a partial area of the elastomeric joint according to FIG. 1, for which an axial loading case is illustrated.

FIGS. 3 and 4 show the area I of FIG. 1 in an enlarged view each. FIG. 3 clearly shows that the contact surface 34 encloses an angle of 45° with the longitudinal axis 16 (or with a line which is parallel to the longitudinal axis 16). In other words, a surface of the contact surface 34 is inclined by an angle of 45° with respect to the longitudinal axis 16. FIG. 4 clearly shows the advantageous effect of this angular relationship. In the event of an axial force $F_{ax}$ acting on the pivot pin 18 and hence on the upper supporting ring 22, the wire ring 32 experiences a resulting force $F_{res}$ which is directed towards the groove 38. As a consequence, the wire ring 32 will be pressed into the groove 38 by the force $F_{res}$ so that any automatic detaching of the wire ring 32 from the groove 38 in the event of axial loads on the elastomeric joint 10 is not possible. This is why the operational reliability of the elastomeric joint 10 is considerably improved.

It goes without saying that the aforementioned angle of 45° between the contact surface 34 and the longitudinal axis 16 may also take on other values, for instance larger or smaller than 45°. Concerning this angle, it is merely important that it is suitably selected such that in the event of any load (in radial and/or in axial directions) acting on the wire ring 32 the resulting force $F_{res}$ always points towards the groove 38 so that the wire ring 32 is prevented from coming loose.

Figure 5:
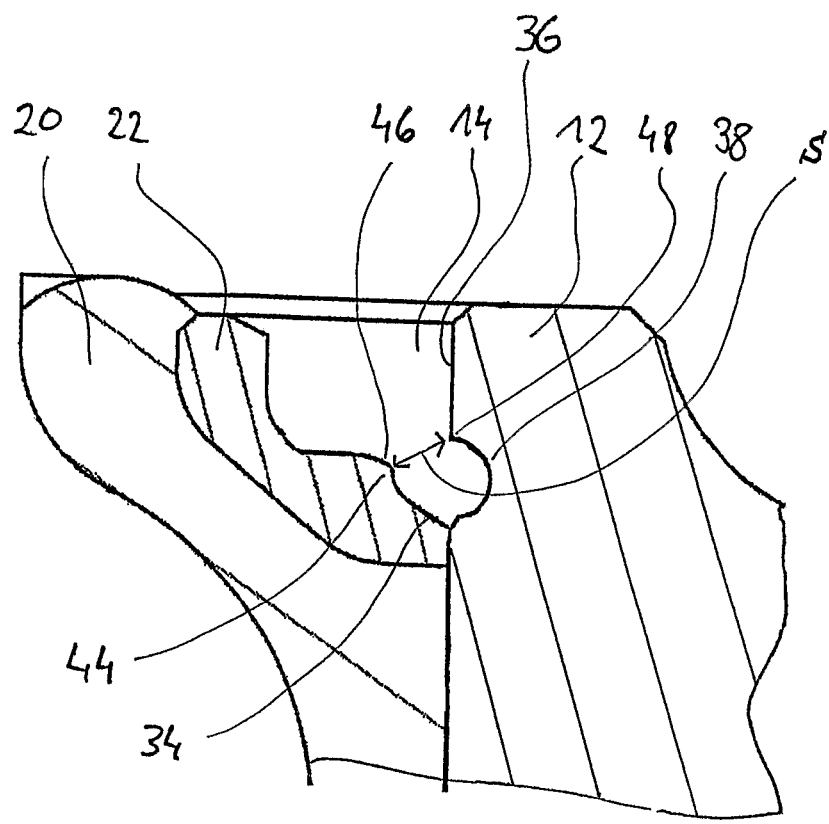
FIG. 5 shows an enlargement of area A of FIG. 4.

FIG. 5 shows area A of FIG. 4 in an enlarged view. For simplification, the wire ring 32 is not shown here. Adjacent to the contact surface 34, the upper supporting ring 22 comprises a bulge 44 which has an apex 46 in the direction towards the adjoining end face of the through-opening 14. The distance between this apex 46 and a point 48 where the groove 38 continues into the inner circumferential surface 36 of the housing 12 is identified by distance s. It is of importance that the distance s is selected so as to be smaller than the diameter of the wire ring 32. In the mounted state, this is also shown in the illustrations of FIG. 2 and FIG. 4. By selecting the distance s so as to be smaller than the diameter of the wire ring 32, the wire ring can not come loose from the groove 38 already because of geometric necessities.

Figure 6:
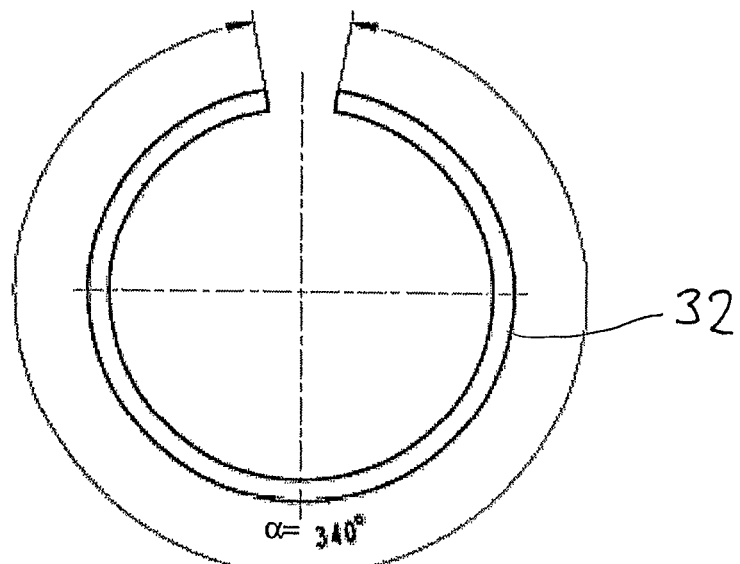
FIG. 6 shows a top view of a wire ring of the elastomeric joint according to the invention.
Figure 7:
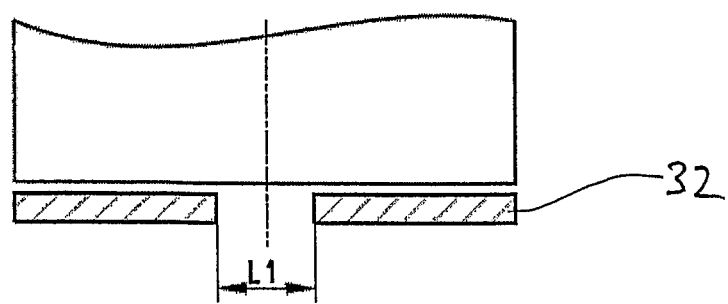
FIG. 7 is a side view of the wire ring of FIG. 6.

FIG. 6 shows the wire ring 32 in a top view. FIG. 7 shows this wire ring 32 in a side view. The wire ring 32 has a circular arc extension of approximately 340°, and hence the distance between the two free ends of the wire ring 32 (in FIG. 6 illustrated by distance L1) is smaller than the distance of the two free ends of the Seeger ring 28 (according to the distance L2 of FIG. 13). The smaller distance of the two free ends of the wire ring 32 and its larger circular arc extension as compared to the Seeger ring additionally results in a higher operational reliability, because the two free ends of the wire ring 32 are subject to smaller axial displacements in the event of axial loads. Moreover, detaching or tilting moments in the area of the groove 38 can not occur because of the round cross-section of the wire ring 32, whereby the axial securement of the upper supporting ring 22 in the housing 12 is further improved.

Similar to the embodiment of FIG. 11, the lower supporting ring 24 rests on a shoulder portion 26 in the embodiment of FIG. 1, this shoulder portion being formed on an inner circumferential surface of the housing 12. Hereby, the lower supporting ring 24 is axially fixed with respect to the housing 12. Deviating from the embodiment shown in FIG. 1, however, it is also possible to use a lower supporting ring which is structurally identical to the upper supporting ring 22. In correspondence to the contact surface 34 of such a supporting ring, the lower area of the housing 12 would be provided with a suitable chamfer or the like instead of the shoulder portion 26, and the contact surface 34 would rest against this chamfer. Apart from cost savings, using supporting rings with identical design offers the significant advantage that assembling the elastomeric joint 10 is simplified because mixing up different supporting rings is avoided.

Figure 8:
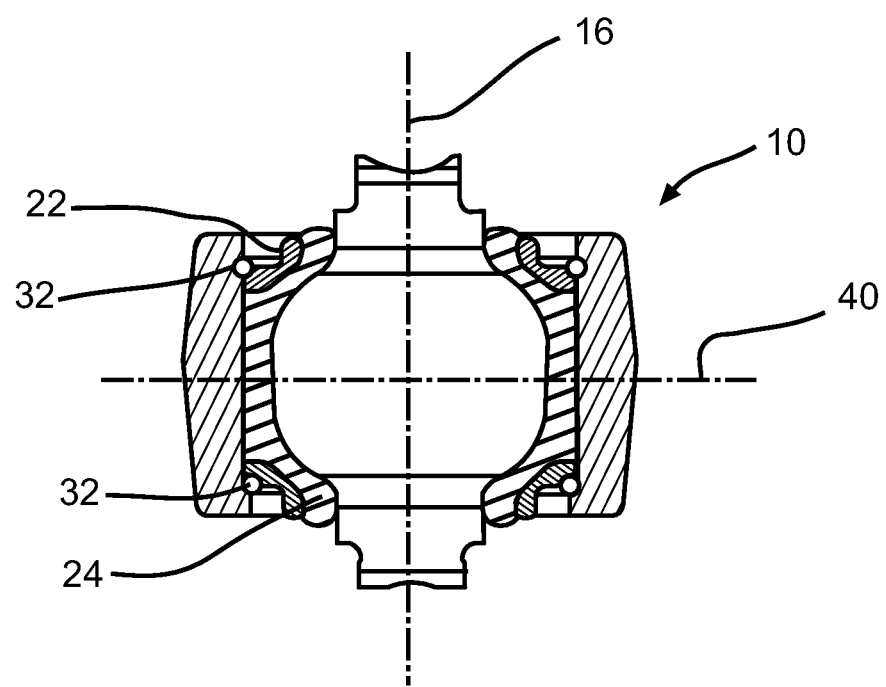
FIG. 8 shows a further embodiment of the elastomeric joint according to the invention in a lateral cross-sectional view, FIGS. 9a, 9b each show side views of a part of the elastomeric joint according to FIG. 1 and FIG. 8, respectively, alternative cross-sectional shapes for a wire ring being illustrated.

FIG. 8 shows a further embodiment of an elastomeric joint 10. Unlike the embodiment of FIG. 1, the upper supporting ring 22 as well as the lower supporting ring 24 are axially secured by a wire ring 32 in the embodiment of FIG. 8. The design of the supporting rings and the complementary grooves in the embodiment of FIG. 8 corresponds to the illustration according to FIG. 2 so that reference is made thereto in order to avoid any repetitions. The embodiment of FIG. 8 has the advantage that an inner circumferential surface of the housing 12 is formed so as to be perfectly symmetric with respect to the transverse axis 40 of the elastomeric joint 10, because the shoulder portion 26 (cf. FIG. 1) is omitted. In the embodiment of FIG. 8, the upper and lower supporting rings 22, 24 may be realized as identical parts, having a favorable effect on the manufacturing costs.

Figure 9A:
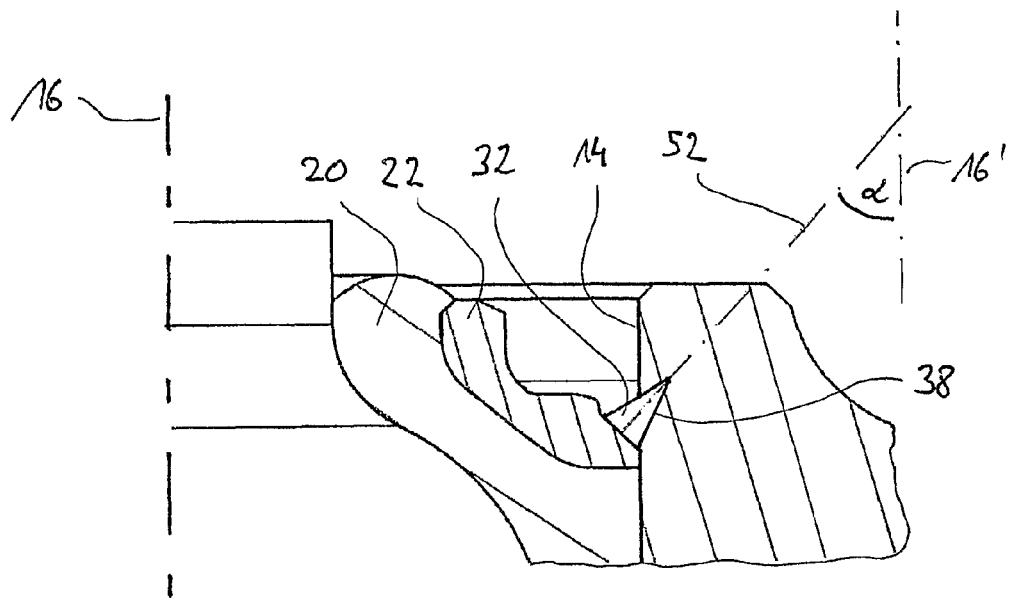
Figure 9B:
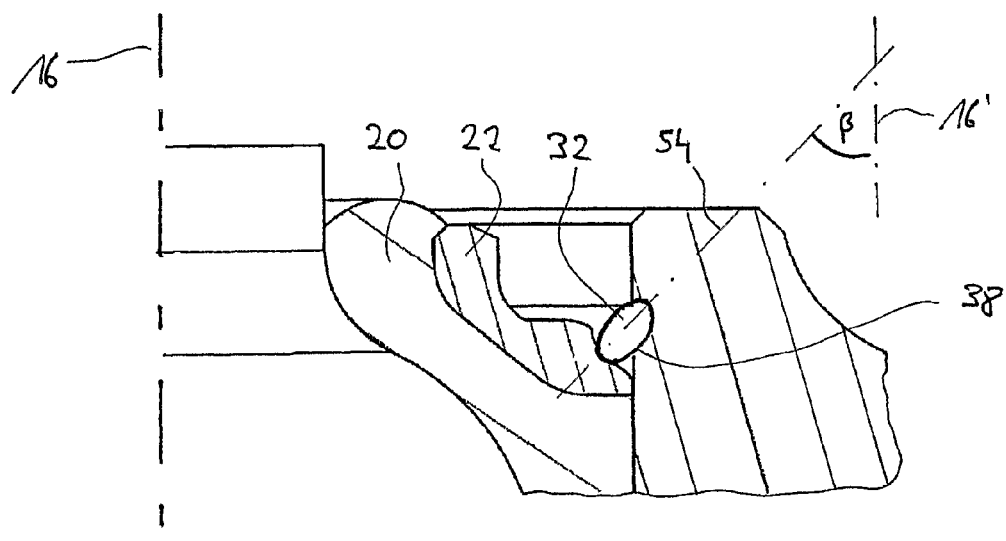

FIGS. 9a and 9b show enlarged partial areas of the elastomeric joint 10 with respect to area I of FIG. 1, with the wire ring 32 having an alternative cross-section here, i.e. in the form of a triangle (FIG. 9a) or in the form of an oval (FIG. 9b). Regarding the triangular cross-sectional shape, the tip of the triangle points towards the adjoining end face of the through-opening 14, whereas an orthogonal line 52, extending through the tip of the triangle and relating to a base side opposite the tip, enclosing an angle α with the longitudinal axis 16 (or with a line 16' parallel thereto). Same applies to the wire ring 32 having an oval cross-section (FIG. 9b), where a longitudinal axis 54 of this oval encloses an angle β with the longitudinal axis 16 of the elastomeric joint 10 (or with a line 16' parallel thereto). The angles α and β are smaller than 90° each.

It goes without saying that the groove 38 formed on the inner circumferential surface 36 of the housing 12 is formed so as to be complementary to the cross-section of the wire ring 32 in the embodiments of the wire ring 32 according to FIGS. 9a and 9b. As a consequence, there will be the same advantages as with the circular cross-sectional shape of the wire ring according to FIG. 4, according to which a resultant force in the event of any loads on the wire ring 32 always points towards the groove 38 and the wire ring 32 is effectively prevented from coming loose.

Figure 10:
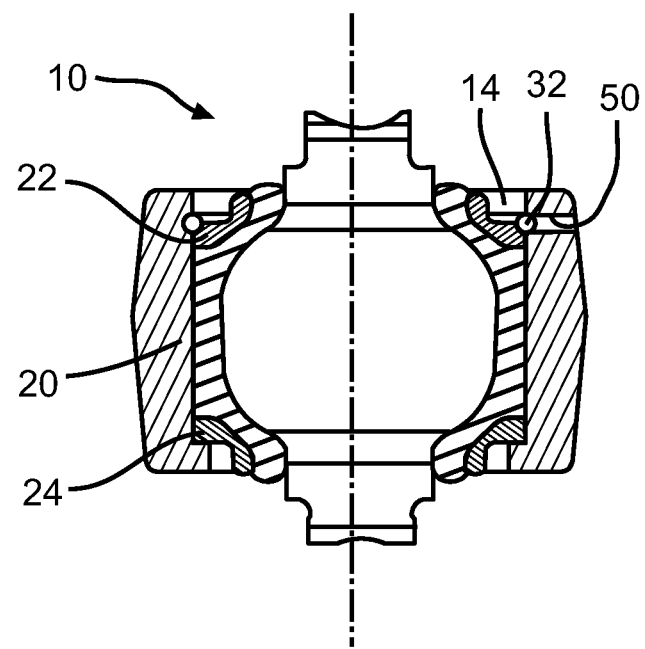
FIG. 10 shows an elastomeric joint according to the invention in a lateral cross-sectional view according to a further embodiment.

FIG. 10 shows a further modification of the elastomeric joint 10. The only difference with respect to the embodiment according to FIG. 1 is that the housing 12 is provided with a lateral bore hole 50 which is accessible from outside. The bore hole 50 extends radially inwards and opens at a place adjoining the wire ring 32. In case of need, the elastomeric joint 10 can be dismantled by means of the bore hole 50. This will be performed in such a manner that the upper supporting ring 22 is first pushed axially inwards by force, i.e. in a direction towards the lower supporting ring 24, against the pretension of the elastomeric body 20. In doing so, the wire ring 32 in the area of the through-opening 14 will be unblocked by the upper supporting ring 22. Subsequently, an auxiliary tool, for instance in the form of a mandrel, can be inserted from outside into the bore hole 50, and the wire ring 32 can then be levered out of the groove 38 by the tip of this mandrel. The tip of the mandrel gets in contact with the wire ring 32 preferably in the area of one of its free ends.

The elastomeric joint 10 according to the invention has an improved performance compared to a conventional elastomeric joint to the effect that damages to the joint (for instance in the form of any detachment of the wire ring or fracture phenomena on the supporting ring) do not occur, even in the event of larger axial or radial loads. In addition, the wire ring 32 can be provided with extremely low-cost ways and means, and the use of such a wire ring requires only marginal modifications on the design of an elastomeric joint which is known per se.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An elastomeric joint configured for chassis components of motor vehicles, comprising:
    a housing comprising a through-opening which extends axially along a longitudinal axis of the elastomeric joint and has opposing end faces,
    a pivot pin which extends through the through-opening of the housing,
    an elastomeric body which is fastened to the pivot pin and is arranged radially between the pivot pin and the housing,
    at least one supporting ring which is mounted to the elastomeric body at a respective one of the end faces of the through-opening, at least one of the supporting rings having a linearly tapered annular contact surface inclined by an angle relative to the longitudinal axis and outwardly facing a respective one of the end faces, and
    a locking element being in contact with the contact surface of the at least one supporting ring and locking the at least one supporting ring with respect to the housing so that the pivot pin is held in the housing in an axially secured manner,
    wherein an inner circumferential surface of the housing comprises a groove whose contour substantially corresponds to a cross-section of the locking element so that the locking element fits in the groove,
    wherein the locking element is formed from a split wire ring,
    wherein an outer surface of the wire ring matingly engages the groove and an inner surface of the wire ring seats upon the contact surface such that the wire ring lies within a plane perpendicular to the longitudinal axis, and
    wherein the angle of the contact surface is selected such that in the event of an axial force acting on the pivot pin in an outward direction from the housing, the wire ring experiences a resulting outward force relative to the longitudinal axis perpendicular to the angle of the contact surface that always points toward the groove to thereby radially expand and press the wire ring into the groove so that the wire ring is prevented from tilting or coming loose.

2. The elastomeric joint according to claim 1, wherein the wire ring has an essentially circular cross-section.

3. The elastomeric joint according to claim 1, wherein the wire ring has an essentially oval cross-section, a longitudinal axis of the oval pointing towards the adjoining end face of the through-opening and including an angle with the longitudinal axis of the elastomeric joint which is smaller than 90°.

4. The elastomeric joint according to claim 1, wherein the wire ring has a polygonal cross-section.

5. The elastomeric joint according to claim 4, wherein the wire ring has a triangular cross-section, a tip of the triangular cross-section being directed towards the adjoining end face of the through-opening and an orthogonal line, extending through the tip and relating to a base side of the triangular cross-section opposite the tip, including an angle with the longitudinal axis of the elastomeric joint which is smaller than 90°.

6. The elastomeric joint according to claim 1, wherein the contact surface includes an angle of essentially 45° with the longitudinal axis of the elastomeric joint.

7. The elastomeric joint according to claim 1, wherein the at least one supporting ring comprises a bulge with an apex adjacent to the contact surface, a distance between the apex and a point, where the groove continues to the inner circumferential surface of the housing, being smaller than the diameter of the wire ring.

8. The elastomeric joint according to claim 1, wherein the wire ring has a circular arc extension of at least 300°.

9. The elastomeric joint according to claim 8, wherein the wire ring has a circular arc extension of at least 340°.

10. The elastomeric joint according to claim 1, wherein the supporting ring is formed from a sheet metal stamped part.

11. The elastomeric joint according to claim 1, wherein the supporting ring is fastened to the elastomeric body.

12. The elastomeric joint according to claim 11, wherein the supporting ring is vulcanized to the elastomeric body.

13. The elastomeric joint according to claim 1, wherein the housing comprises a bore hole which is accessible from outside and opens at a place adjoining the wire ring.

14. The elastomeric joint according to claim 1, wherein both end faces of the through-opening are provided with a supporting ring which is locked with respect to the housing by means of a locking element in the form of the wire ring.

* * * * *